3,518,762
SEALING MATERIALS USEFUL IN
DENTAL PRACTICE
Mitsuharu Takeuchi, 26–19 2-chome, Ichikawa,
Ichikawa-shi, Chiba-ken, Japan
No Drawing. Filed Oct. 25, 1966, Ser. No. 589,211
Int. Cl. A61k 5/02
U.S. Cl. 32—15                    2 Claims

ABSTRACT OF THE DISCLOSURE

Tooth filling material useful for sealing cracks, fissures and cavities consists of monomeric lower alkyl α-cyanoacrylate, such as ethyl α-cyanoacrylate monomer, which is applied to the tooth followed by a second material comprising microfine particles of a dentally acceptable solid material, which particles may be in admixture with or coated with lower alkyl methacrylate polymer, such as methacrylate polymer powder, the dentally acceptable solid material being gold, silver, nickel, tin, aluminum, platinum, indium, copper, iron, chromium, stainless steel, brass, indium-silver alloy, porcelain or fibrous or powdery glass. After the monomeric alkyl α-cyanoacrylate is applied and spread over the openings in the tooth structure, the second material is added and pressed into the pits or fissures and allowed to cure in situ.

---

This invention relates to sealing materials useful in dental practice. Particularly, the present invention is concerned with sealing materials which are usable to seal pits and fissures of teeth for the purpose of dental caries prevention or to fill the cavity in decayed teeth for the purpose of treatment.

Hitherto, there has been made sealing of pits and fissures of apparently sound teeth, without cavity preparation for the purpose of caries prevention. For this purpose, nitrocellulose and other materials have been proposed, which, however, are practically of no value because of their having only very poor adhesion to the applied parts. Lower alkyl α-cyanoacrylate singly or in combination with methyl methacrylate polymer also has been proposed by me as a sealing material for pits and fissures. When monomeric lower alkyl α-cyanoacrylate is used in sealing of pits and fissures, the monomer does not readily polymerize at the intermediate portion between the walls of the pits and fissures, while it can enter in the pits and fissures well and rapidly polymerize on the part adjacent to the walls. The combination of monomeric lower alkyl α-cyanoacrylate with polymeric lower alkyl methacrylate is free from such disadvantage as encountered in use of monomeric lower alkyl α-acyanoacrylate, but this combination is not effective for use over a long period because of its extreme abrasion within two or three months.

It is accordingly an object of the present invention to provide a new and improved sealing method and the materials usable therefor which make it possible to effect sealing of pits and fissures on sound teeth, without cavity preparation.

In accordance with the present invention, sealing of pits and fissures of teeth can be effected by using two sealing materials in the determined sequence. The sealing materials are a first material and a second material.

The first material used in this invention is monomeric lower alkyl α-cyanoacrylate, e.g. methyl, ethyl, propyl and butyl α-cyanoacrylates.

The second material used in this invention can be any one of the following three:

(a) Microfine particles of a dentally acceptable, solid material selected from the group consisting of gold, silver, nickel, tin, aluminum, platinum, indium, copper, iron, chromium, stainless steel, brass and indium-silver alloy; porcelain and fibrous or powdery glass. These particles should preferably be in particle size of about 10 microns to about 1000 microns.

(b) Microfine particles of the above-indicated dentally acceptable, solid material in admixture with lower alkyl methacrylate polymer powder. In this case, too, the preferred particle size of the solid particles is about 10–1000 micron.

(c) Microfine particles of the above-indicated dentally acceptable solid material, these particles being individually coated with lower alkyl methacrylate polymer. Such microfine particles can be prepared, for example, by heating the solid material having a particle size of about 3–500 microns and monomeric lower alkyl methacrylate and then drying and pulverizing the resultant mass.

In carrying out desired sealing in practice by using these materials, the first material is applied to the pits and fissures of teeth which have been cleaned in the conventionally known manner. After spreading the first material, the second material is added, whereupon curing takes place smoothly and uniformly.

Use of the first material and the second material (a) can provide sealing with improved abrasion resistance, but there is a slight disadvantage, i.e. too short pasty time for polymerization, which will make the sealing procedures difficult. Preferred is the combination of the first material and the second material (b) or (c) in sequence, because these combinations can show good penetration while retaining sufficient abrasion resistance to effect sealing. As well understood by those skilled in the art, the first and second materials should be kept separately before use.

The sealing materials when used in combination are effective to seal pits and fissures of apparently caries-free sound teeth, without cavity preparation. The sealed teeth have good abrasion resistance, without exfoliation of the sealed part, and show good durability over a long term.

The following examples describe certain ways in which the principle of the invention has been applied, but are not to be construed as limiting its scope.

EXAMPLE 1

Apparently caries-free sound teeth are sealed by the following procedures, for the purpose of dental caries prevention.

The occlusal surface of the teeth is cleaned with a polishing brush and water, without using any polishing agent, and then dried with alcohol and compressed air. One or two drops of ethyl α-cyanoacrylate monomer are put on the inlets of pits and fissures and spread over the openings of the pits and fissures by using an explorer. On the surface of the fissures, polymerization of the cyanoacrylate monomer immediately takes place, whereas the said monomer remains in pasty state, without occurrence of the polymerization, at the part remote from the fissure wall. To the cyanoacrylate monomer remained intact, a powdery mixture of methyl methacrylate polymer and a gold alloy (50–400 microns) at the weight ratio of 1:20 is added. Since curing readily occurs, the pasty mass is put into the pits and fissures by pressing. After about one minute, the excessive mass is taken off and the tooth surface is finished by grinding and polishing.

EXAMPLE 2

Instead of the powdery mixture referred to in Example 1, a mixture of methyl methacrylate polymer powder and indium-silver alloy (with the particle size of 30–200 microns) at the weight ratio of 1:10 is used. Following the same procedures as in Example 1, sealing of the pits and fissures of sound teeth is effected without cavity preparation.

EXAMPLE 3

Instead of the powdery mixture referred to in Example 1, a powdered silver allow of 50–300 microns in particle size is used. Curing is faster than that when methyl methacrylate polymer powder is used in combination.

EXAMPLE 4

Instead of the powdery mixture referred to in Example 1, a mixture comprising powdered glass and aluminum alloy (both with the particle size of 50–300 microns) with methyl methacrylate polymer powder at the weight ratio of 3:1 is used.

EXAMPLE 5

Ethyl α-cyanoacrylate is used as a first material. A second material is a polymer-coated silver-indium alloy which is prepared by adding 5 g. of silver-indium alloy of about 3–5 microns in particle size to 20 ml. of monomeric methyl methacrylate and heating the mixture which is then dried and pulverized.

EXAMPLE 6

A first material is ethyl α-cyanoacrylate. A second material used is the same as that of Example 5, with exception that gold is used instead of the silver-indium alloy.

What is claimed is:
1. A method for the prevention of dental caries by sealing pits and fissures on sound teeth which comprises
   (1) placing on the inlets of the pits and fissures and spreading over the openings of the fissures a small amount of a first material comprising monomeric lower alkyl α-cyanoacrylate,
   (2) adding thereto a second material comprising microfine particles of a dentally acceptable solid material which particles (are) coated with lower alkyl methacrylate polymer, said dentally acceptable solid material being selected from the group consisting of gold, silver, nickel, tin, aluminum, platinum, indium, copper, iron, chromium, stainless steel, brass and indium-silver alloy, porcelain and fibrous or powdery glass, and then
   (3) putting the resulting pasty mass into the pits and fissures by pressing, prior to complete curing of the pasty mass.
2. The method according to claim 1 wherein said microfine particles are coated with methyl methacrylate polymer.

References Cited
UNITED STATES PATENTS 3,191,303  6/1965  Baum _____ 32—15
3,250,002  5/1966  Collito _____ 32—15 XR ROBERT PESHOCK, Primary Examiner